United States Patent
Brunel et al.

(10) Patent No.: US 9,248,404 B2
(45) Date of Patent: Feb. 2, 2016

(54) MOTOR VEHICLE EXHAUST LINE

(75) Inventors: Jean-Paul Brunel, Meslieres (FR); Yohann Perrot, Belleville-en-Caux (FR)

(73) Assignee: Faurecia Systemes D'Echappement, Nanterre (FR)

( * ) Notice: Subject to any disclaimer, the term of this patent is extended or adjusted under 35 U.S.C. 154(b) by 377 days.

(21) Appl. No.: 13/879,874

(22) PCT Filed: Oct. 18, 2011

(86) PCT No.: PCT/FR2011/052425
§ 371 (c)(1),
(2), (4) Date: Apr. 17, 2013

(87) PCT Pub. No.: WO2012/052672
PCT Pub. Date: Apr. 26, 2012

(65) Prior Publication Data
US 2013/0216442 A1 Aug. 22, 2013

(30) Foreign Application Priority Data
Oct. 18, 2010 (FR) ..................... 10 58479

(51) Int. Cl.
*B01D 50/00* (2006.01)
*B01D 53/94* (2006.01)
(Continued)

(52) U.S. Cl.
CPC ........ *B01D 53/9477* (2013.01); *B01F 3/04049* (2013.01); *B01F 5/0065* (2013.01); *B01F 5/0473* (2013.01); *B01F 5/0614* (2013.01); *F01N 3/20* (2013.01); *F01N 3/206* (2013.01); *F01N 3/2892* (2013.01);
(Continued)

(58) Field of Classification Search
CPC ... F01N 3/2892; F01N 3/206; F01N 2610/02; B01F 2215/0431; B01F 3/04049; B01F 5/0473
USPC .................................................. 422/168, 172
See application file for complete search history.

(56) References Cited

U.S. PATENT DOCUMENTS 7,533,520 B2 * 5/2009 Cheng et al. .................... 60/286
2009/0019842 A1 * 1/2009 Suzuki et al. ................... 60/301
(Continued)

FOREIGN PATENT DOCUMENTS

| DE | 102005020045 A1 | 11/2006 |
|---|---|---|
| FR | 2878563 A1 * | 6/2006 |
| FR | 2928687 A1 | 9/2009 |

OTHER PUBLICATIONS

French Search Report dated Dec. 20, 2011.

*Primary Examiner* — Tom P Duong
(74) *Attorney, Agent, or Firm* — Carlson, Gaskey & Olds, PC

(57) ABSTRACT

A motor vehicle exhaust line includes a hot pipe, and a cold pipe for exhaust gases. A mechanical decoupling element connects a downstream end of the hot pipe to an upstream end of the cold pipe. The exhaust line also includes a nitrogen oxide treatment device and an injector intended to reinject a reagent into, or to produce a reagent in the exhaust line upstream of the nitrogen oxide treatment device. The exhaust line includes a mixer intended to mix the exhaust gases and the reagent injected or produced by the injector. The mixer is positioned upstream of the nitrogen oxide treatment device. The nitrogen oxide treatment device is disposed in the cold pipe downstream of the mechanical decoupling element. The injector and the mixer form an assembly connected directly to the mechanical decoupling element.

24 Claims, 14 Drawing Sheets

(51) Int. Cl.
    *B01F 3/04*    (2006.01)
    *B01F 5/00*    (2006.01)
    *B01F 5/04*    (2006.01)
    *B01F 5/06*    (2006.01)
    *F01N 3/20*    (2006.01)
    *F01N 3/28*    (2006.01)
    *F01N 13/18*   (2010.01)

(52) U.S. Cl.
    CPC .... *F01N 13/1811* (2013.01); *B01F 2215/0431* (2013.01); *F01N 2240/20* (2013.01); *F01N 2610/02* (2013.01); *F01N 2610/1453* (2013.01)

(56) References Cited

U.S. PATENT DOCUMENTS

2009/0084094 A1    4/2009    Goss
2010/0083643 A1    4/2010    Hayashi

* cited by examiner

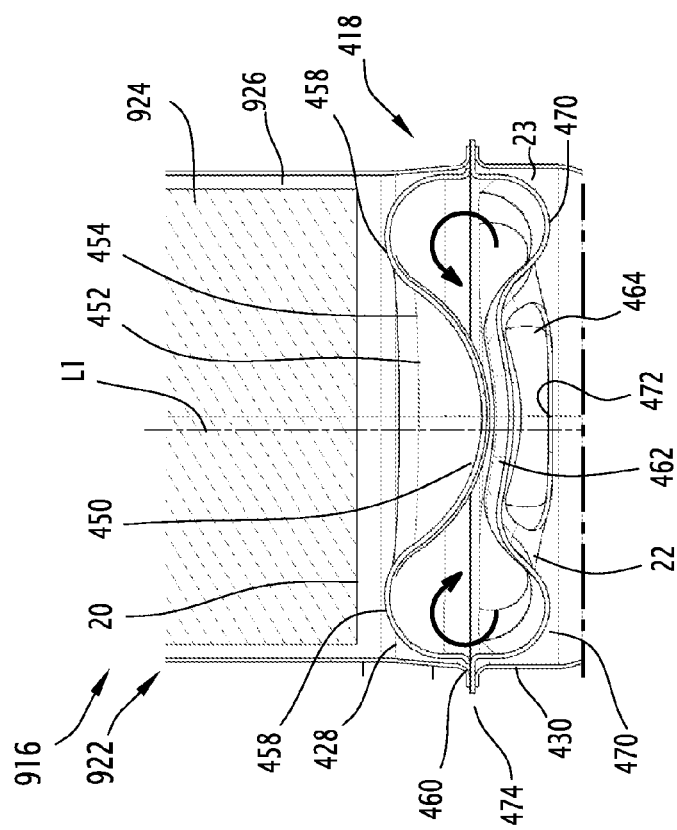
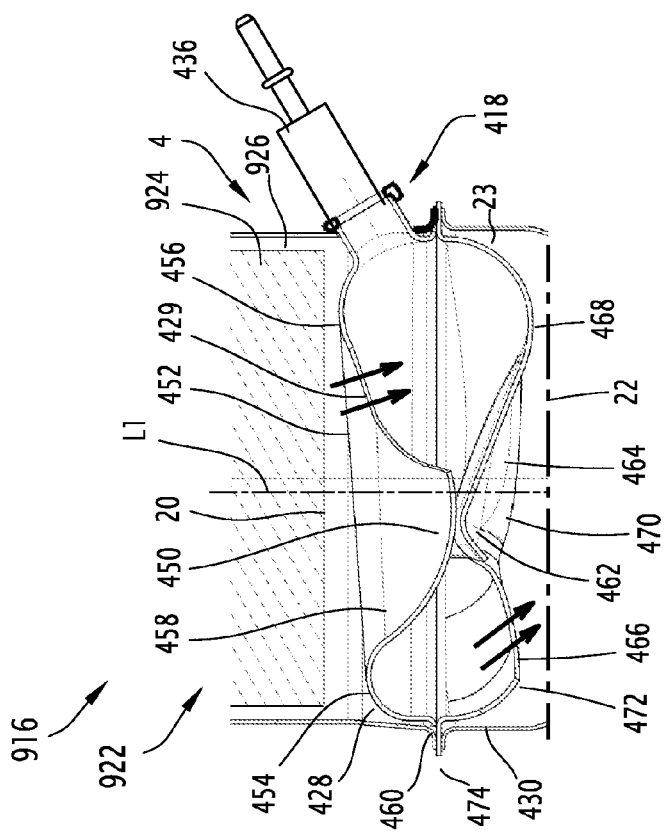
FIG. 15
FIG. 14

MOTOR VEHICLE EXHAUST LINE

TECHNICAL FIELD

The present invention relates to a motor vehicle exhaust line of the type comprising: a hot pipe for exhaust gases; a cold pipe for the exhaust gases; a mechanical decoupling element connecting a downstream end of the hot pipe to an upstream end of the cold pipe; a nitrogen oxide treatment device; and an injector intended to inject a reagent into, or to produce a reagent in the exhaust line upstream of the nitrogen oxide treatment device.

BACKGROUND

Such an exhaust line is provided to equip an internal combustion engine, for example a diesel engine. It includes a catalyst provided to reduce the nitrogen oxides and an injector placed upstream from the catalyst. The injector is designed to inject a reagent, in particular a reducing agent or substance producing a reducing agent of the nitrogen oxides, such as urea, in the exhaust line. The urea consecutively undergoes two chemical reactions, thermolysis and hydrolysis, and is converted into ammonia. Within the catalyst and when the exhaust gases reach a certain temperature, the ammonia reacts chemically with the nitrogen oxides, reducing them into nitrogen and water.

In an exhaust line including an SCR system, i.e., the catalyst performing the selective reduction of the nitrogen oxides, the injection of the reducing agent is generally located downstream from the mechanical decoupling element to prevent damaging the latter, for example to avoid the risks of corrosion and mechanical failure. Such an arrangement nevertheless has the major drawback of increasing the startup time for the conversion of nitrogen oxides due to the distance of the SCR system from the engine.

In light of the aforementioned constraints, the architecture of such an exhaust line including an SCR system makes it more difficult to obtain an effective increase in the conversion of nitrogen oxides $NO_x$ when the vehicle is traveling under urban conditions, as it is not possible to reach the threshold or minimum temperature authorizing the injection of the reducing agent quickly.

In this context, the invention aims to propose an exhaust line whereof the operation is more satisfactory, with a more effective conversion of the nitrogen oxides.

SUMMARY

To that end, the invention relates to an exhaust line of the aforementioned type, and which further includes a mixer intended to mix the exhaust gases and the reagent injected or produced by the injector. The mixer is positioned upstream of the nitrogen oxide treatment device, and the nitrogen oxide treatment device being positioned in the cold pipe downstream from the mechanical decoupling element. The injector and the mixer form an assembly connected directly to the mechanical decoupling element.

The assembly is formed by the injector and the mixer is inserted in the hot pipe directly upstream from the mechanical decoupling element.

The assembly is formed by the injector and the mixer is inserted in the cold pipe directly downstream from the mechanical decoupling element.

The nitrogen oxide treatment device is a selective reduction catalyst of the nitrogen oxides.

The exhaust line includes an oxidation catalyst positioned upstream from the assembly formed by the injector and the mixer.

The mixer includes an injection portion positioned between an upstream face and a downstream face respectively defined by an exhaust gas inlet into and an exhaust gas outlet outside the mixer. The injection portion includes an exhaust gas duct extending from the upstream face to the downstream face. The exhaust gas duct has a central line having a set length between the upstream and downstream faces. The injector includes a reagent injector mounted on the injection portion and capable of injecting or producing a reagent in the injection portion. The injection portion includes at least one first cup positioned inside the duct such that a mean path of the exhaust gases in the duct is at least 20% greater relative to the set length.

The set length is, in one example, between 40 and 140 mm.

The first cup has a bottom wound in a spiral around the central line of the injection portion.

The bottom of the first cup is wound in a spiral around the central line of the injection portion for performing three quarters of a revolution.

The first cup has an opening at an end of the spiral furthest from the upstream face.

The first cup includes a beak at the end of the spiral furthest from the upstream face.

The beak extends the bottom of the first cup toward the upstream face and toward the outside of the spiral.

The injection portion includes a second cup positioned inside the duct between the upstream face and the first cup. The second cup has a bottom winding in a spiral around the central line of the injection portion.

The second cup has an opening at the end of the spiral furthest from the upstream face.

The second cup has an opening at the end of the spiral closest to the upstream face.

The first and second cups define a spiral-shaped conduit between them, starting from the opening of the second cup and going to the opening of the first cup, extending over at least 180°, preferably 275°, and having a straight cross-section substantially larger than 2,300 mm$^2$.

The first cup includes a rounded wall having a central area protruding toward the upstream face and a hollow peripheral area turned toward the upstream face surrounding the protruding central area. An opening is formed in the wall of the first cup between the protruding central area and the hollow peripheral area.

The injection portion includes a second cup positioned inside the duct between the upstream face and the first cup. The second cup includes a rounded wall having a hollow central area turned toward the upstream face and a peripheral area protruding toward the upstream face surrounding the hollow central area. An opening is formed in the wall of the second cup between the hollow central area and the protruding peripheral area.

The first and second cups are configured to impart a helical movement to the exhaust gases from the opening of the second cup to the opening of the first cup.

The injection of the reagent is done between the first cup and the second cup.

The opening of the first cup and the opening of the second cup are angularly offset relative to one another around the central line.

The cup has perforations with a diameter substantially equal to 5 mm or an opening.

The first cup includes a wire mesh layer over at least part of its surface.

The reagent injector is oriented such that an injection direction is perpendicular to the injection portion.

The reagent injector is oriented such that the injection direction is parallel to the tangent to the injection portion.

These and other features may be best understood from the following drawings and specification.

BRIEF DESCRIPTION OF THE DRAWINGS

The invention will be better understood upon reading the following description, provided solely as an example and done in reference to the appended drawings, in which:

FIG. 14 is a profile view of a third embodiment of the injection portion according to the invention;

FIG. 15 is another profile view of the third embodiment of the injection portion of FIG. 14.

DETAILED DESCRIPTION

In the following description, upstream and downstream will be understood relative to the normal direction of movement of the exhaust gases through the exhaust line, indicated by the arrows F in the Figures.

Figure 1:
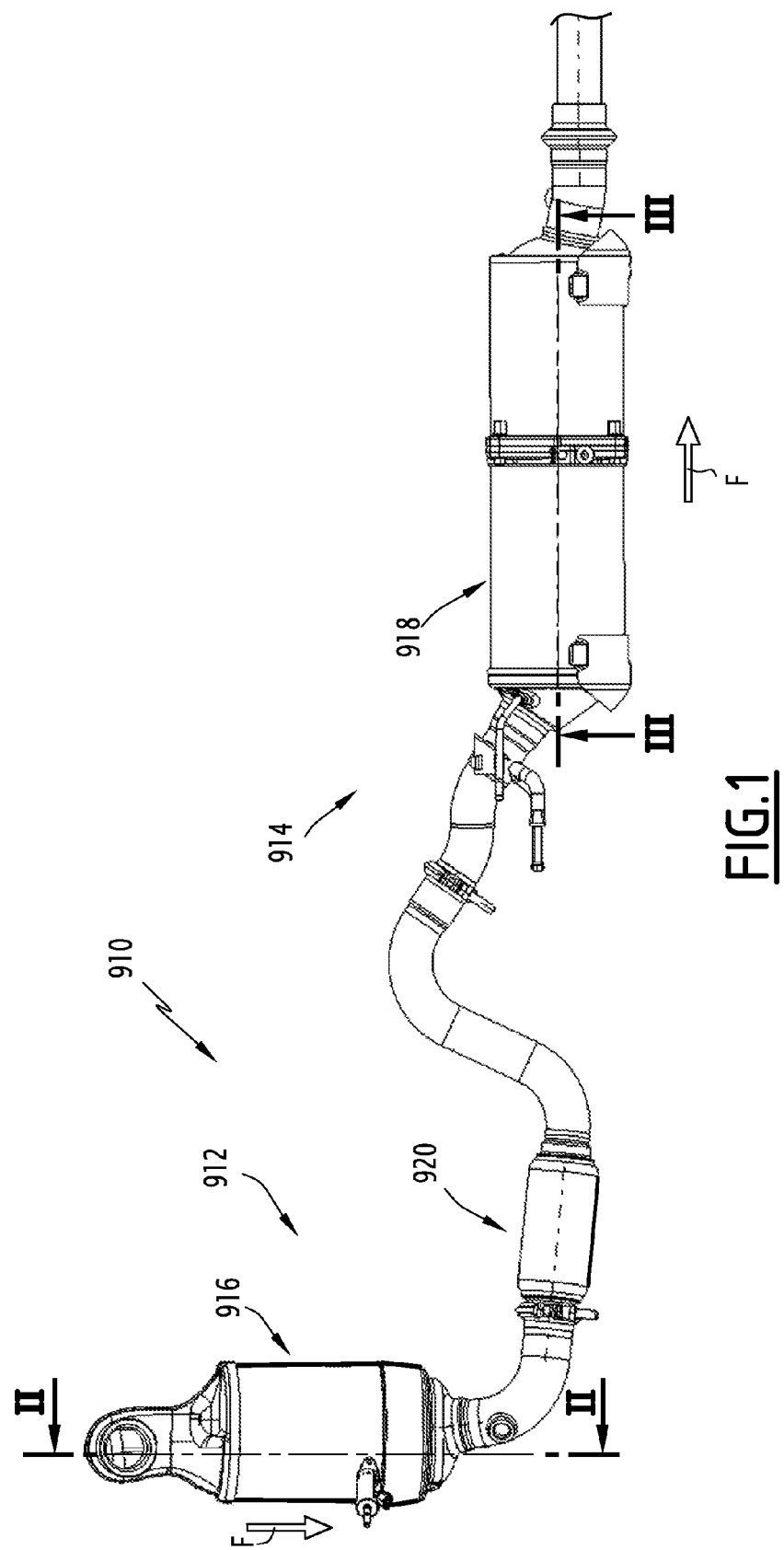
FIG. 1 is a diagrammatic perspective view of an exhaust line according to the invention.

FIG. 1 shows an exhaust line 910 provided to be mounted on a motor vehicle equipped with an internal combustion engine, for example a diesel engine. The exhaust line 910 typically includes, positioned in series, an exhaust gas manifold at the outlet of the engine, optionally a turbocharger, at least one exhaust gas purifying device, and a muffler.

The pollutants resulting from the combustion of the diesel engine primarily comprise uncombusted hydrocarbons HC, nitrogen oxides $NO_x$ (nitric oxide NO and nitrogen dioxide $NO_2$), carbon monoxide CO, and soot particles.

In a known manner, the device for purifying exhaust gases comprises at least one element from among a catalytic purifying member and/or a particle filter.

The catalytic purifying member is suitable for treating pollutant emissions in gaseous phase, while the particle filter is suitable for retaining the soot particles emitted by the engine and optionally for binding the gaseous pollutants.

The catalytic purifying member for example comprises a gas-permeable structure covered with catalytic metals favoring the oxidation of the combustion gases and/or the reduction of the nitrogen oxides.

The exhaust gas 910 comprises a hot pipe 912 for the exhaust gases positioned close to the engine of the vehicle and a cold pipe 914 for the exhaust gases positioned further from the engine, downstream from the hot pipe 912.

The hot 912 and cold 914 pipes respectively include devices 916 and 918 for purifying the exhaust gases positioned in series and downstream from the engine.

The exhaust line 910 also comprises a mechanical decoupling element 920 sealably connecting the downstream end of the hot pipe 912 to the upstream end of the cold pipe 914. The mechanical decoupling element 920 is crossed by the exhaust gases traveling from the hot pipe 912 to the cold pipe 914.

This mechanical decoupling element 920, for example, comprises a flexible sleeve made up of a wire mesh and sealed against the exhaust gases.

Alternatively, the mechanical decoupling element 920 is of the type described in document FR-2878563.

The mechanical decoupling element 920 makes it possible to compensate for the vibrations of the engine along the exhaust line 910, between the different elements of the hot 912 and cold 914 pipes.

Figure 2:
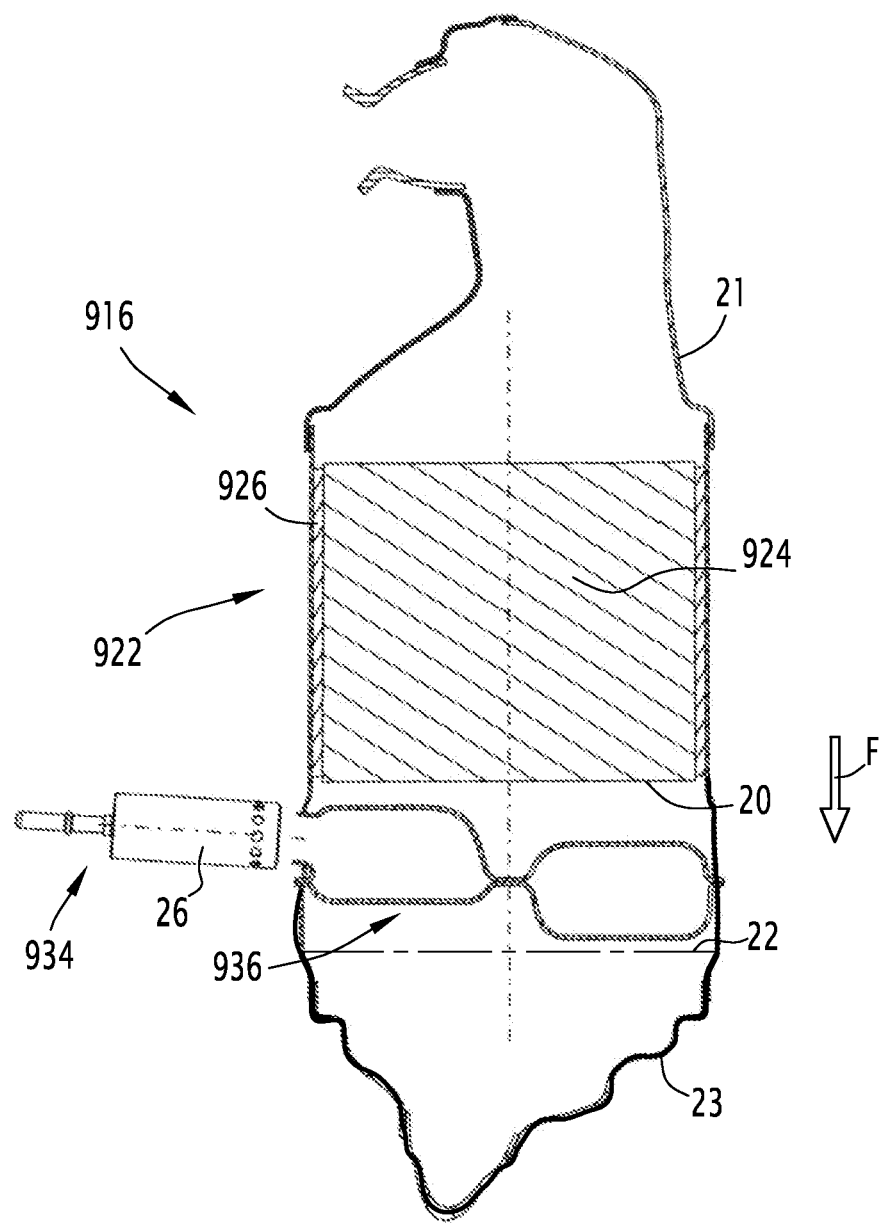
FIG. 2 is a longitudinal cross-sectional view along line II-II of FIG. 1 and illustrating a first part of the exhaust line of FIG. 1 according to a first embodiment of the invention.

In reference to FIG. 2, the first device 916 for purifying the exhaust gases comprises an oxidation catalyst (DOC) 922 including an upstream monolith 924 housed inside an outer enclosure 926.

The outer enclosure 926 forms a shroud having a substantially constant transverse section over its entire length.

The first exhaust gas purifying device 916 also comprises an upstream enclosure portion 21 connected to and diverging toward the upstream end of the outer enclosure 926, and a downstream enclosure portion 23 connected to and converging from the downstream end of the outer enclosure 926.

The upstream enclosure portion 21 defines the exhaust gas inlet in the first exhaust gas purifying device 916, with the downstream enclosure portion 23 defining the outlet for the exhaust gases from the first exhaust gas purifying device 916.

The DOC 922 converts the HC and CO from the engine to meet anti-pollution standards, converts part of the NO into $NO_2$, and creates the exotherm that makes it possible to achieve temperature conditions that are favorable to the reduction reaction of the $NO_x$ by a low-temperature reducing agent. It is essentially made up of precious metals (platinum, palladium, rhodium) positioned on an oxide substrate. The substrate can be made from cordierite or may be metallic, depending on its location in the exhaust line 910.

Alternatively, the exhaust line 910 comprises a plurality of DOCs 922, the different functions being able to be distributed among the different DOCs 922, the primary function of all of the DOCs 922 being to treat the HC and CO.

Figure 3:
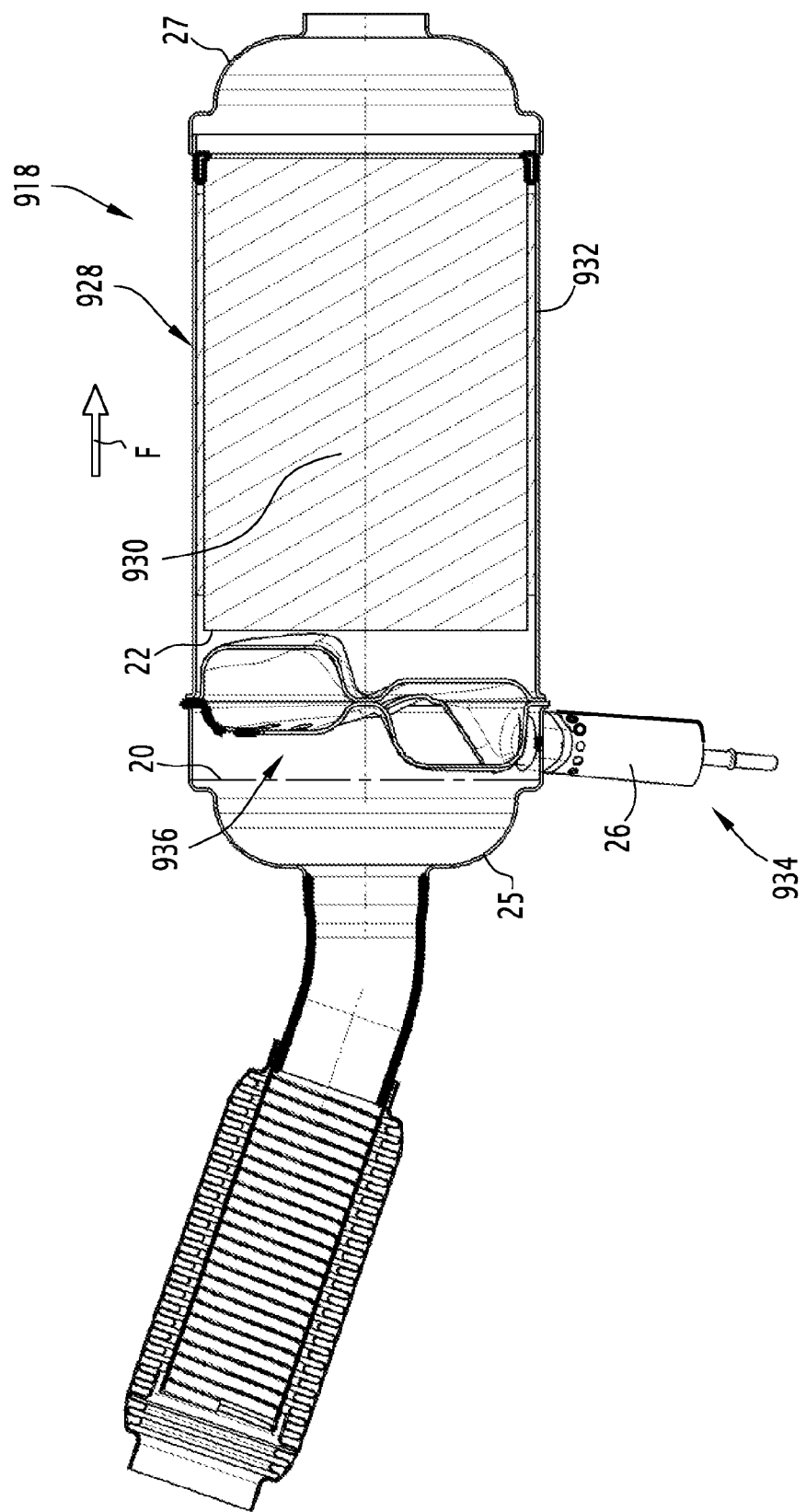
FIG. 3 is a longitudinal cross-sectional view along line III-III of FIG. 1 and illustrating a second part of the exhaust line of FIG. 1 according to a second embodiment of the invention.

As illustrated in FIG. 3, the second exhaust gas purifying device 918 comprises a device 928 for treating the nitrogen oxides formed by a selective reduction catalyst of the nitrogen oxides (SCR).

The device 928 for treating the nitrogen oxides is thus inserted in the cold pipe 914 of the exhaust line 910 downstream from the mechanical decoupling element 920.

The SCR catalyst 928 includes a downstream monolith 930 housed inside an outer enclosure 932. The downstream monolith 930 is formed from a porous material, which is permeable to the exhaust gases. It is, for example, configured as a honeycomb. The material is typically formed from cordierite, silicon carbide or a metallic material. It is impregnated with catalytic material. Thus, the downstream monolith 930 is capable of trapping reducing chemical species injected by an injector, as will be explained in more detail later, and causing certain components, such as the nitrogen oxide contained in the exhaust gases, to react with said reducing species to reduce the nitrogen oxides, in particular into gaseous nitrogen.

The outer enclosure 932 forms a shroud having a substantially constant transverse cross-section over its entire length.

The second exhaust gas purifying device 918 also comprises an upstream enclosure portion 25 connected to and diverging toward the upstream end of the outer enclosure 932, and a downstream enclosure portion 27 connected to and converging from the downstream end of the outer enclosure 932.

The upstream enclosure portion 25 defines the exhaust gas inlet in the second exhaust gas purifying device 918, with the downstream enclosure portion 27 defining the outlet of the exhaust gases from the second exhaust gas purifying device 918.

The exhaust line 910 comprises (FIGS. 2 and 3) an assembly formed by an injector 934 designed to inject or produce a reagent in the exhaust line 910 upstream from the nitrogen oxide treatment device 928 and a mixer 936 designed to mix the exhaust gases and the reagent injected or produced by the injector 934.

According to a first embodiment of the invention illustrated in FIG. 2, the assembly formed by the injector 934 and the mixer 936 is integrated into the first exhaust gas purifying device 916 and positioned downstream from the DOC 922. This assembly is thus inserted in the hot pipe 912 of the exhaust line 910, upstream from the SCR catalyst 928.

The assembly formed by the injector 934 and the mixer 936 is directly connected to the mechanical decoupling element 920 and positioned directly upstream from the mechanical decoupling element 920. In fact, in this first embodiment, no element other than the connecting hoses and/or enclosure portions is inserted between the assembly formed by the injector 934 and the mixer 936 and the mechanical decoupling element 920 situated downstream from that assembly. In particular, no exhaust gas purifying device, in particular no SCR catalyst, is positioned between the assembly and the mechanical decoupling element 920.

The injector 934 includes a reagent injector 26 capable of injecting or producing a reagent in the mixer 936. The reagent is typically a liquid solution of a nitrogen oxide reducing agent or a substance producing such a reducing agent. The reducing agent may be one or more hydrocarbon(s), partially oxidized hydrocarbonaceous species, ammonia, or a compound generating ammonia by chemical decomposition. The reagent may also assume a gaseous form, such as ammonia gas. Preferably, the reagent injector 26 is provided to inject a mixture of water and urea in the form of droplets inside the mixer 936.

The injector 934 also includes a supply line for supplying the reagent injector 26 with liquid to be injected, and a control to allow or prohibit the supply of the reagent injector 26 by the supply line. The control is, for example, a valve controlled by a computer.

Figure 4:
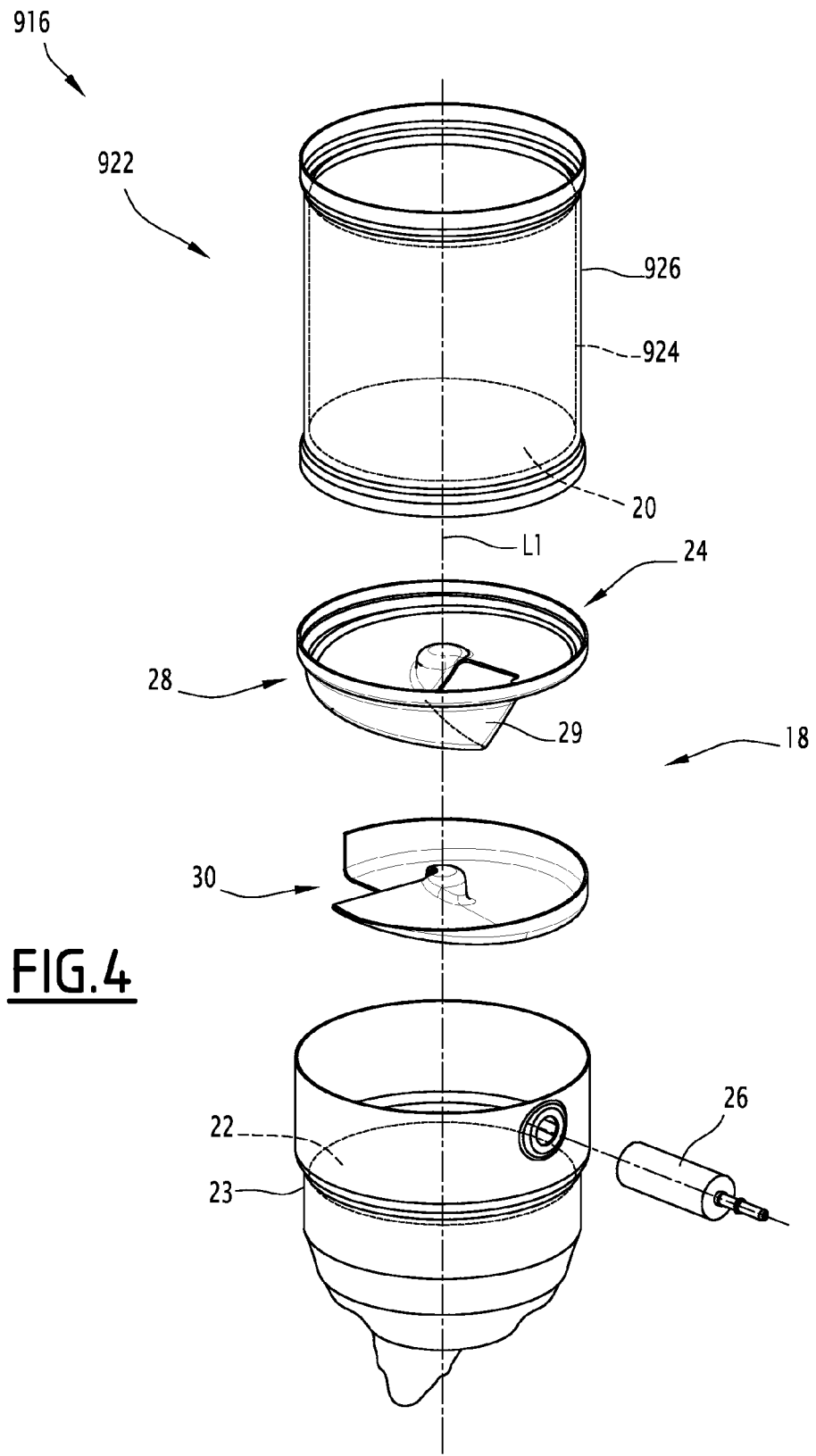
FIG. 4 is an exploded perspective view of an injection portion according to a first embodiment of the invention.
Figure 5:
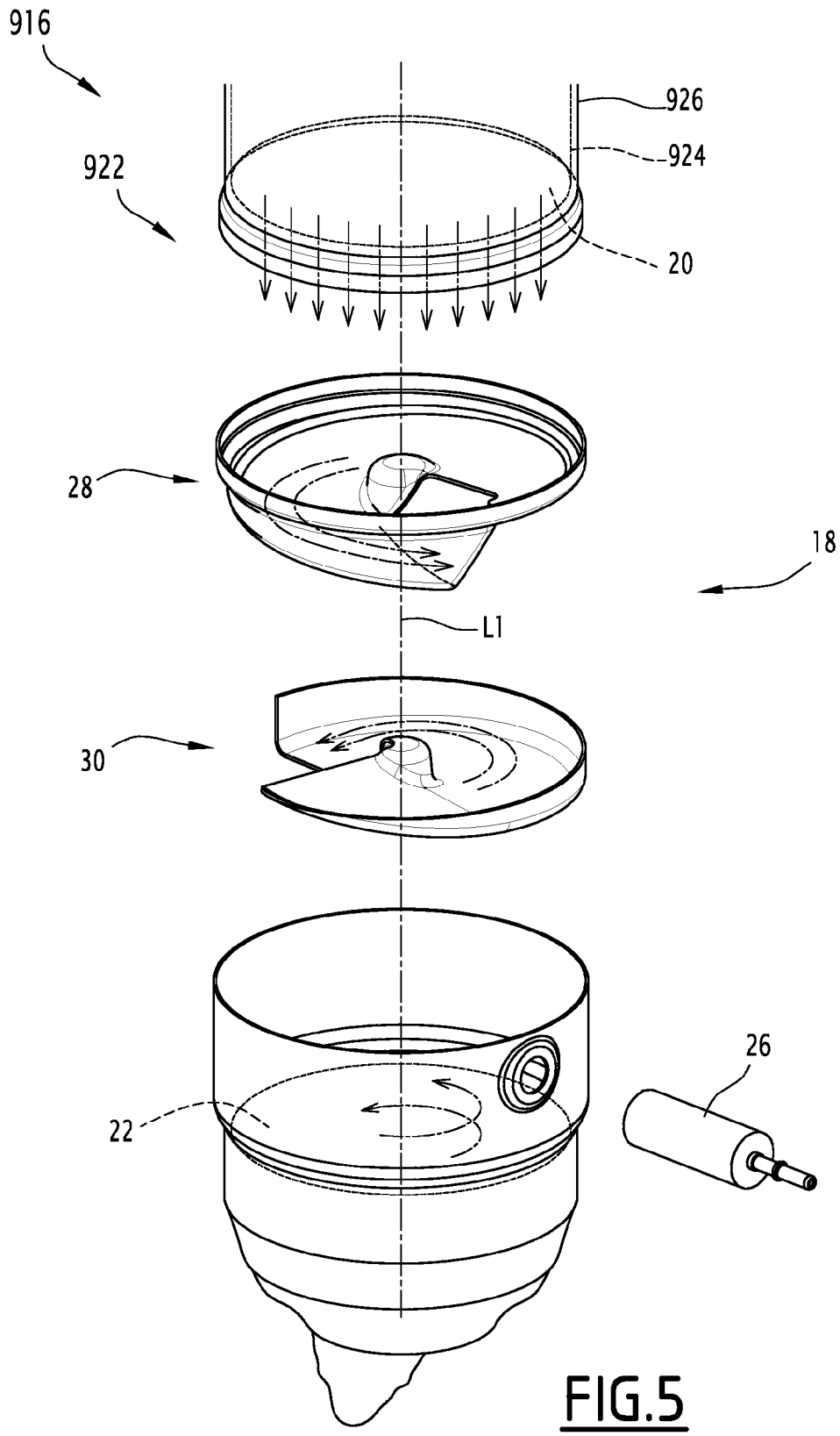
FIG. 5 is an exploded perspective view of the injection portion of FIG. 4 illustrating its operation.
Figure 6:
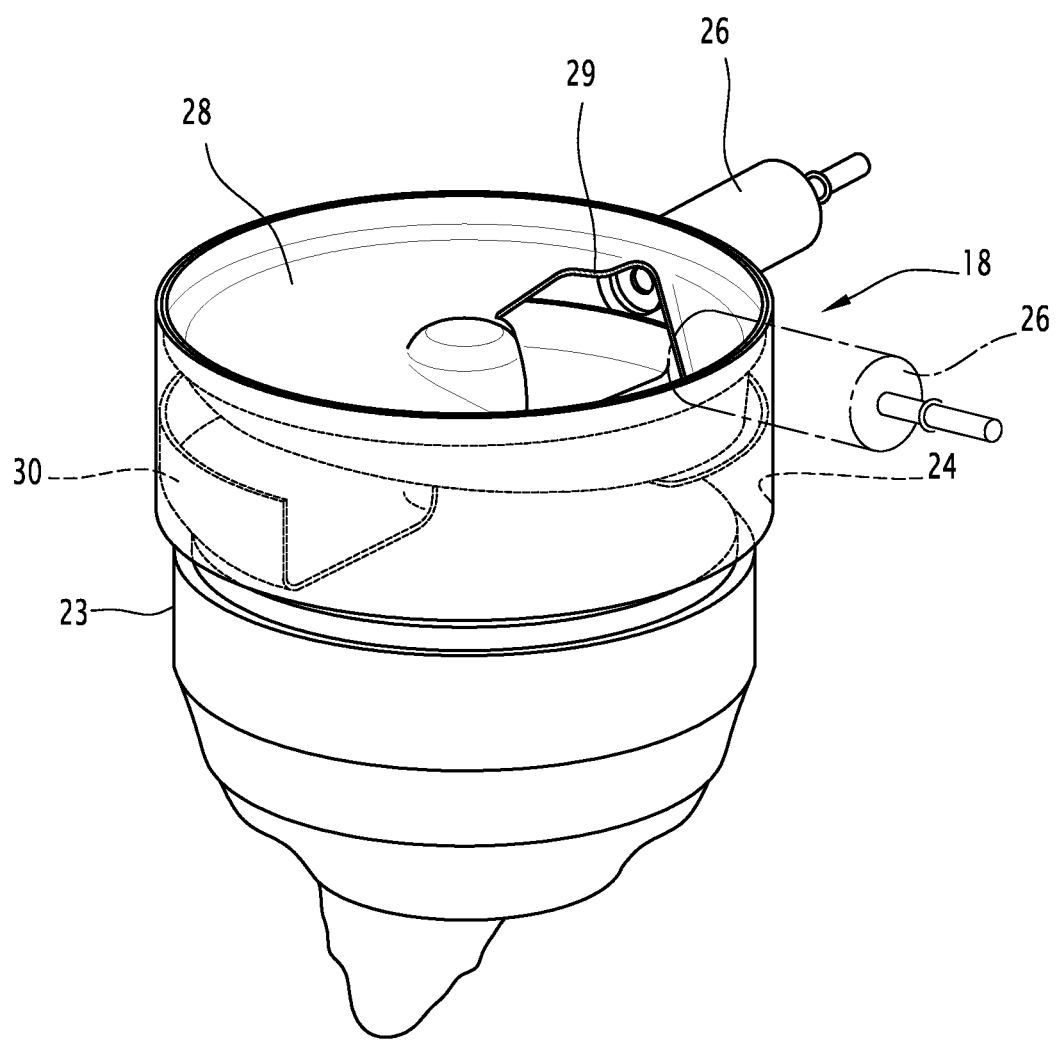
FIG. 6 is a compact perspective view of the injection portion of FIG. 4.

The mixer 936 includes an injection portion 18 according to a first embodiment of the invention illustrated in FIGS. 4 to 6.

The injection portion 18 is positioned between an upstream face 20 defined by the upstream monolith 924 of the oxidation catalyst 922 and a downstream face 22 defined, for example, by a plane from which the transverse cross-section of the downstream enclosure portion 23 begins to decrease.

Thus, the upstream face 20 is the face by which the exhaust gases leave the upstream monolith 924 and enter the mixer 936, and the downstream face 22 is the face by which the exhaust gases leave the mixer 936 and enter the mechanical decoupling element 920, via the downstream enclosure portion 23 and optionally connecting hoses.

The injection portion 18 comprises a duct 24 allowing a stream of exhaust gas to pass from the upstream face 20 to the downstream face 22.

The reagent injector 26 is mounted on the injection portion 18 and is capable of injecting a reagent into the injection portion 18.

The duct 24 has a central line L1 having a set length between the upstream 20 and downstream 22 faces. The central line L1 is the line passing through the geometric centers of the straight cross-sections of the duct 24. In the illustrated example, it is the straight line parallel to the axis of the upstream monolith 924. It is perpendicular to the upstream 20 and downstream 22 faces and passes through their centers.

The injection portion 18 includes a cup 28 positioned inside the duct 24 in the path of the exhaust gas stream. That cup 28 is called a weir. The weir 28 has a bottom winding in a spiral around the central line L1 of the injection portion 18 and a large opening 29 at the end of the spiral furthest from the upstream face 20. The opening 29 is inclined both relative to the central line L1 and relative to a plane perpendicular to the central line L1.

The diameter of the cup 28 is equal to the inner diameter of the exhaust gas ducts 24. It extends in the entire straight cross-section of the duct 24. The peripheral edge of the cup 28 bears against the inner surface of the duct 24.

The spiral shape of the weir 28 initiates the rotary movement of the exhaust gases, the only way out being downstream. The exhaust gases perform approximately one complete revolution.

The uppermost part of the weir 28 is approximately 6 mm from the outlet face 20 of the upstream monolith 924. According to one alternative, this distance may be increased up to 10 mm to avoid excessively increasing the back pressure.

Furthermore, the injection portion 18 includes a second cup 30, called "channel," positioned inside the duct 24 between the first cup 28 and the downstream face 22, the second cup 30 having a bottom winding in a spiral around the central line L1 of the injection portion 18.

Preferably, the bottom of the second cup 30 winds in a spiral around the central line L1 of the injection portion 18 while performing three quarters of a revolution.

The second cup 30 has an opening at the end of the spiral furthest from the upstream face 20. That opening is limited by the two end edges of the spiral-shaped bottom of the second cup 30 and the wall of the duct 24.

The diameter of the second cup 30 is equal to the inner diameter of the exhaust gas duct 24. It extends in the entire straight cross-section of the duct 24, the peripheral edge of the cup 30 bearing against the inner surface of the duct 24.

The two cups 28, 30 define a spiral-shaped conduit between them, going from the opening 29 of the weir 28 to the opening of the cup 30 and extending over at least 180°, preferably 275°. The spiral-shaped conduit is laterally limited by the inner surface of the duct 24.

The spiral-shaped conduit and the openings of the cups offer the exhaust gases a cross-section substantially greater than 2,300 $mm^2$ and preferably at least 2,375 $mm^2$. This cross-section corresponds to a section of a tube with a diameter of 55 mm, commonly used in exhaust lines and in particular in the injection area.

The opening of the first cup 28 and the opening of the second cup 30 are angularly offset relative to one another around the central line L1, to prevent any direct path parallel to the central line L1 of the injection portion of the exhaust gas stream.

The injection portion has a cylindrical side wall with a diameter of approximately 150 mm, i.e., substantially equal to the diameters of the gas treatment devices, and a length comprised between 40 and 140 mm. Preferably, the distance between the upstream face 20 and the downstream face 22 is comprised between 60 and 100 mm.

The side wall is integral with the downstream enclosure portion 23.

The first and second cups are fixed to the side wall, for example, by welds.

The side wall comprises an opening intended to insert and fasten the reagent injector 26, the reagent here being urea, to the wall between the first cup 28 and the second cup 30. The injector is oriented so that the injection direction is perpendicular to the side wall.

According to one alternative, the injector is oriented such that the injection direction has an angle comprised between 40° and 45° relative to the tangent to the side wall so as to make the jet co-current with the exhaust gas.

According to another alternative shown in mixed lines in FIG. 6, the injector 26 is oriented such that the injection direction is parallel to the tangent to the side wall, thereby making it possible to obtain a more compact injection portion 18.

According to another alternative, the first cup 28 comprises a local deflector to prevent contact between the jet of urea droplets and the upstream monolith 924. For example, the local deflector is formed by cutting out the first cup.

The operation of the exhaust line described above will now be outlined, in light of FIG. 5, in which exhaust gas stream lines are illustrated.

After having passed through the upstream monolith 924, the exhaust gases leave the upstream monolith 924 with a substantially uniform distribution. The exhaust gas stream is laminar and substantially parallel to the central line L1. The exhaust gases arrive on the first cup 28. The travel of the gases parallel to the central line L1 is blocked by the first cup 28, the spiral shape of which initiates the rotary movement of the gases.

The gases then enter the channel 30, the spiral shape of which maintains the rotary movement of the exhaust gases.

At the outlet of the first cup 28 or weir, the urea is injected into the upstream portion of the channel 30. The conversion of the urea into ammonia occurs during the passage of the gases in the channel 30, i.e., during the time necessary for the gas to perform three quarters of revolution. The mean distance traveled by the exhaust gases during those three quarters of a revolution is approximately 180 mm. That distance corresponds to the distance necessary to convert the urea into ammonia if an injector is used that has a jet characterized by a mean diameter (SMD) of 90 μm, a discharge speed of 25 ms, and a dispersion angle of 16°.

Once the gases have reached the opening or outlet of the channel 30, they pass through the downstream enclosure portion 23 and optionally connecting hoses to enter the mechanical decoupling element 920.

The gases that reach this stage have on average already performed slightly more than one revolution; they have therefore acquired a significant tangential velocity and "attack" the downstream surface 22 with that component. It is known that this manner of arriving on a surface favors the obtainment of a good, uniform distribution on said surface.

The injection portion 18 typically has a length of only 60 mm and a diameter of 150 mm, i.e., the diameter of the outer enclosure surrounding the upstream monolith. Thus, as illustrated in FIG. 6, the injection portion is contained in a cylinder with a diameter of 60×150 mm and makes it possible to increase the mean path of the exhaust gas stream lines by at least 20% relative to the set length between the upstream face 20 and the downstream face 22.

Furthermore, if the gas flow rate is different from the example cited above, then the length of the cylinder will be different to form a necessary passage section. If the flow rate is higher, then the distance between the upstream and downstream faces will need to be increased. If it is lower, that distance will then be able to be decreased.

This embodiment can be used in a horizontal or vertical portion, under a floor or under a manifold (in the close position) of a motor vehicle.

This system of course works with all types of urea injectors, but the characteristics of these different injectors clearly has a wide range of jets. These jets have wide or narrow cones, variable mean diameters for very fine or very large droplets, and higher or lower discharge speeds.

Figure 7:
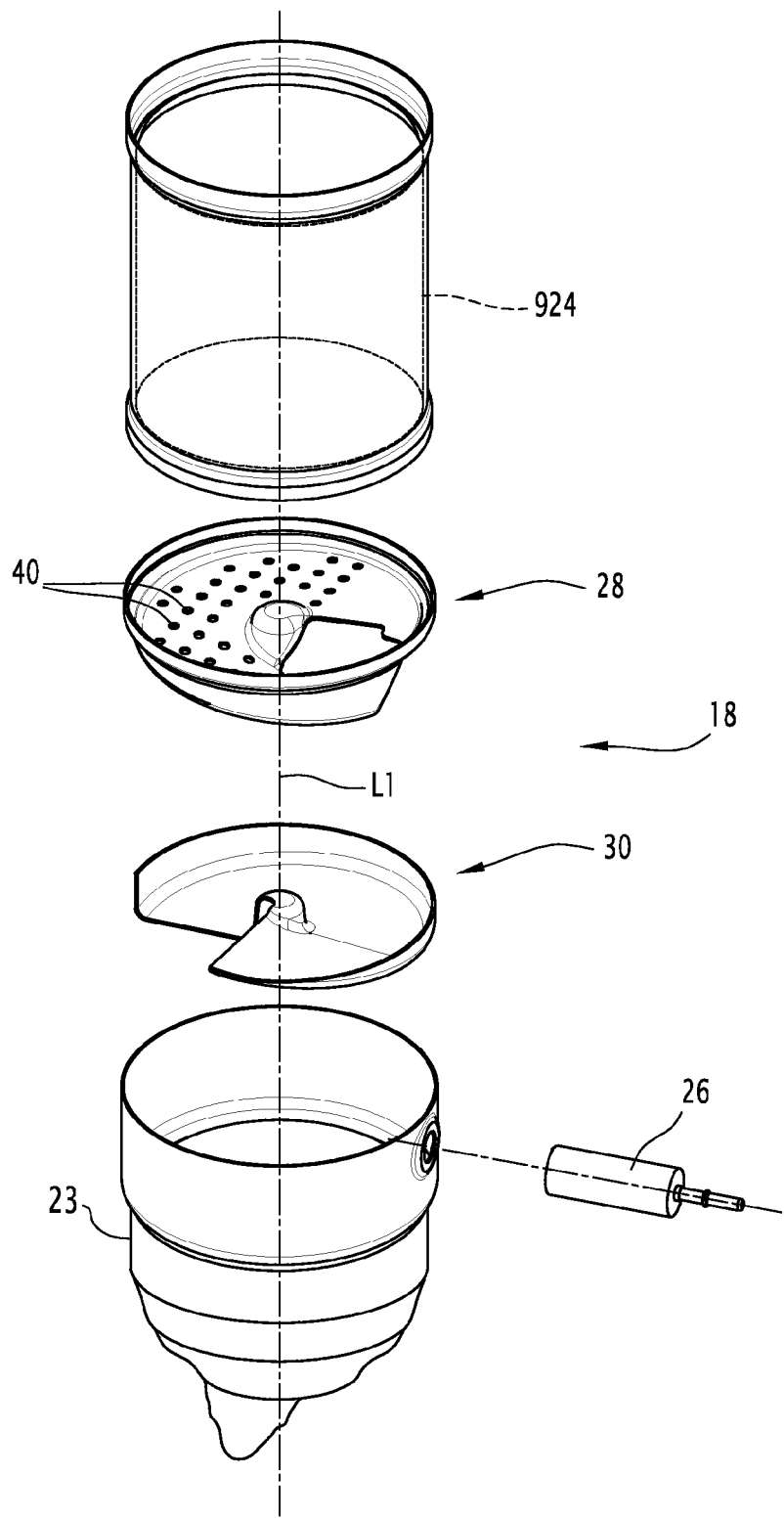
FIG. 7 is a view of the injection portion of FIG. 4 provided with a device for homogenizing the gas/urea mixture.

Consequently, to ensure optimal homogenization, as shown in FIG. 7, the first cup 28 includes perforations 40 with a diameter substantially equal to 5 mm.

For example, if the injector 26 has a jet with little energy and very fine droplets, then the urea droplets will not penetrate the gaseous stream deeply. The concentration of urea on the outer edge of the channel 30 will therefore be greater than the concentration at the center. The presence of perforations 40 of the weir 28 above the outer edge of the channel 30 will allow the gas leaving the upstream monolith 924 to short-circuit the inlet of the channel 30 and deplete the urea/air ratio at the periphery of the channel 30.

Conversely, if the characteristics of the injector 26 are such that a large portion of the urea is located inside, in the central portion, of the channel 30, the perforations 40 will overhang that area.

Figure 8:
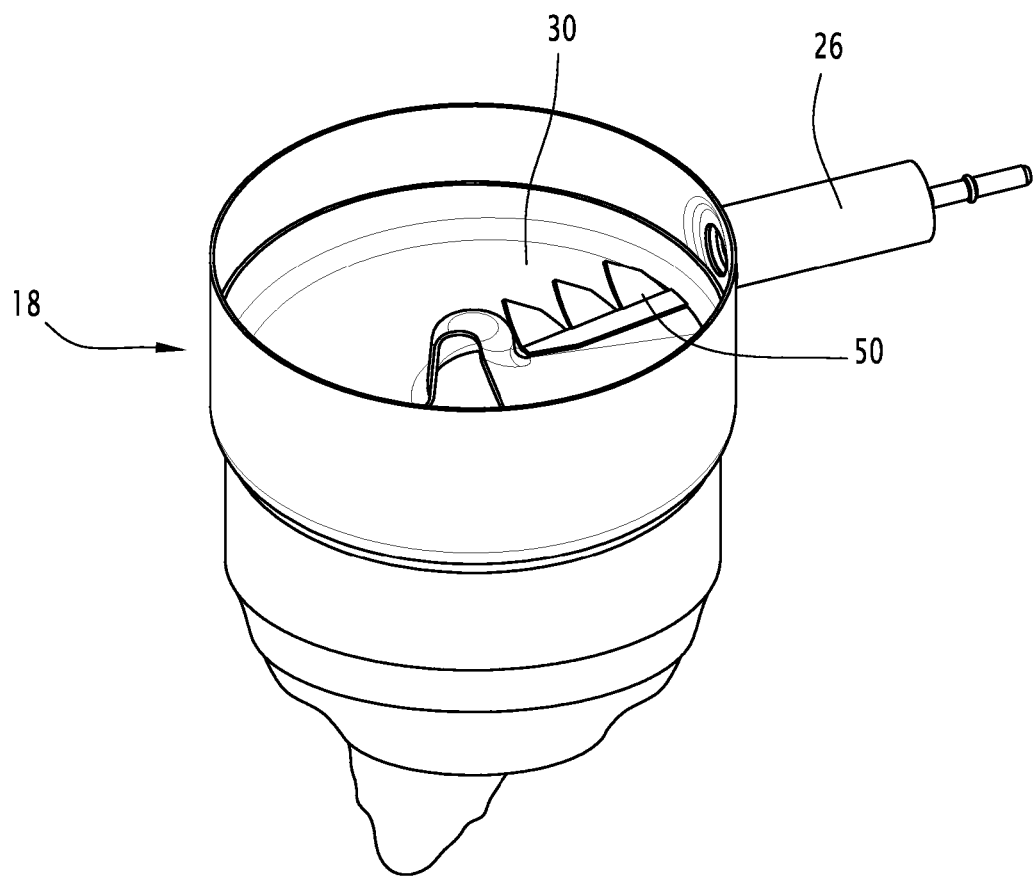
FIG. 8 is a view of the injection portion of FIG. 4 provided with a device for homogenizing the gas/urea mixture.
Figure 9:
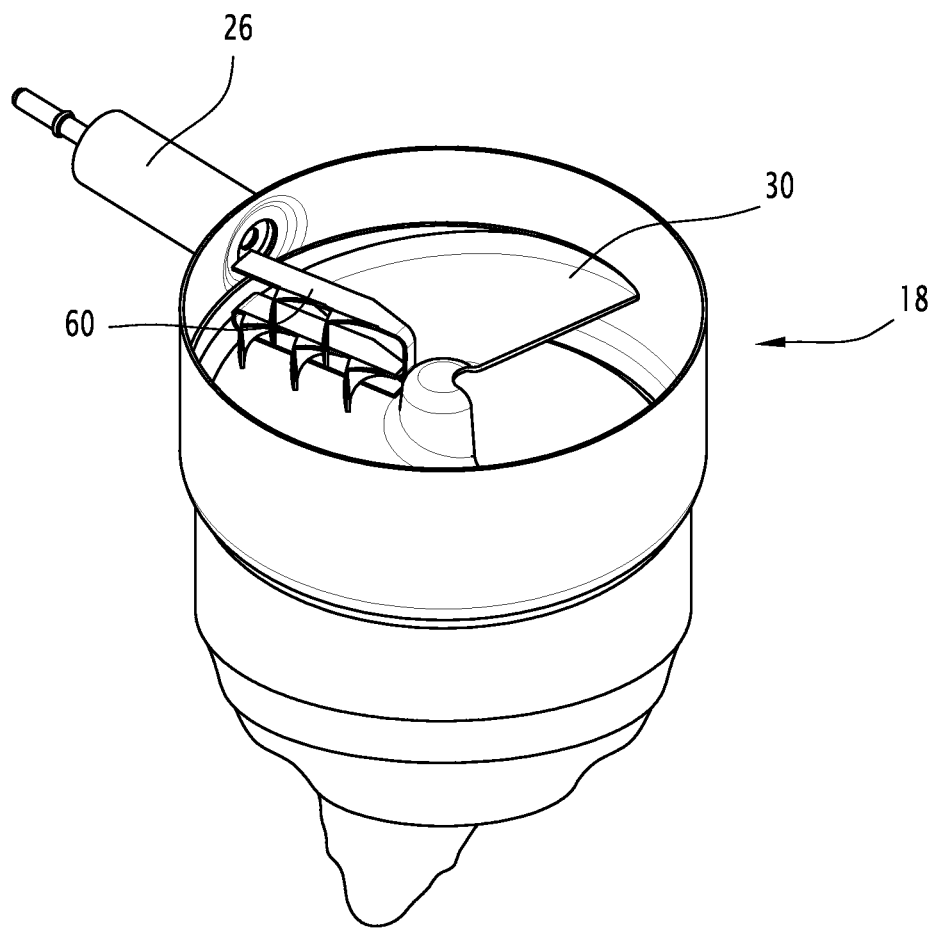
FIG. 9 is a view of the injection portion of FIG. 4 provided with a device for homogenizing the gas/urea mixture.

In one alternative illustrated in FIGS. 8 and 9, the injection portion 18 includes a linear mixer situated between the two cups to create obstacles that aim to disrupt the stream to homogenize the exhaust gases and the urea or ammonia. This mixer may assume the form of fins 50 or raised tongues fastened on the second cup 30 and oriented toward the first cup 28 (not shown here) as shown in FIG. 8, or a helical shape 60 as shown in FIG. 9.

Figure 10:
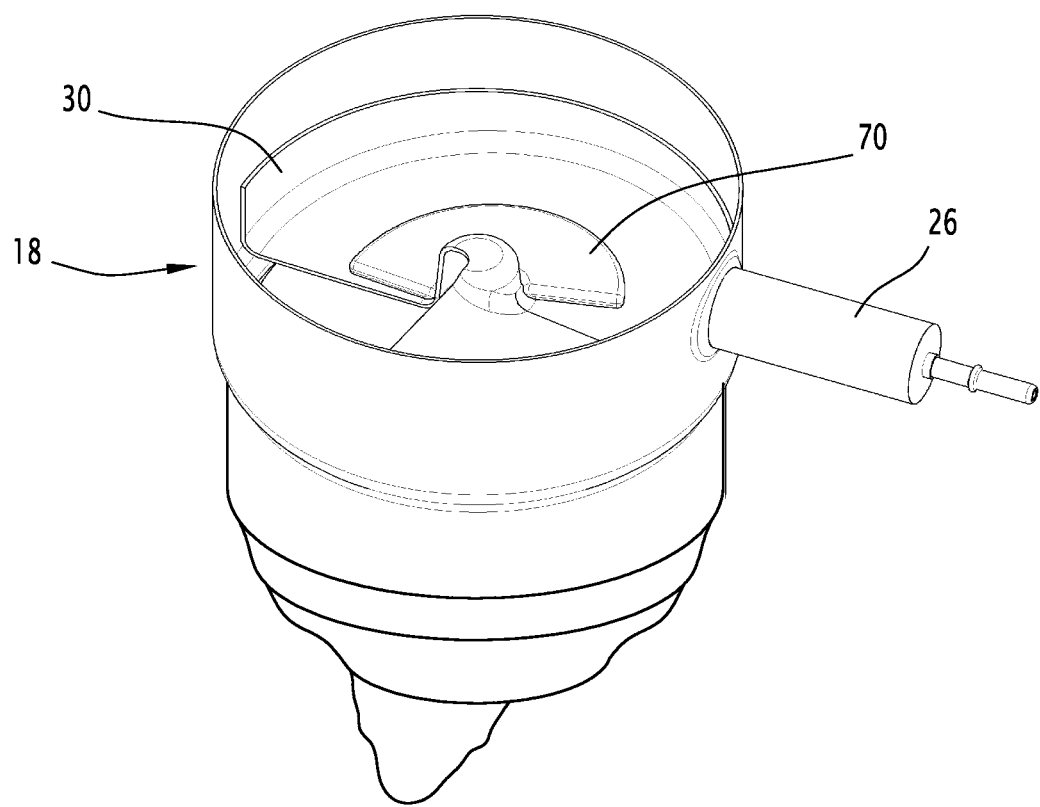
FIG. 10 is a view of the injection portion of FIG. 4 provided with a device for homogenizing the gas/urea mixture.

According to another alternative shown in FIG. 10, the second cup 30 includes a wire mesh layer 70 positioned on at least part of the surface of the second cup 30. Positioning the second cup 30 independently of the other pieces making up the injection portion 18 before assembly makes it possible to deposit a wire mesh layer 70 in the locations where it is necessary to optimize the evaporation and the conversion of the urea into ammonia. In fact, it is very difficult to deposit a wire mesh layer 70 in an exhaust tube. In a known manner, adding a wire mesh layer 70 makes it possible to increase the contact surface between the urea and the exhaust gases by significantly increasing the metal/gas exchange surface.

In FIG. 10, the portion of the channel 30 covered by the wire mesh 70 is hotter than an outer wall; consequently, the evaporation and the conversion of the urea into ammonia will be easier and faster there.

It is also possible to fix a wire mesh layer 70 on the lower portion of the first cup 28 (not shown here) across from the second cup 30.

It is understood that the injection portion 18 may include one or more of these alternatives designed to obtain optimal homogenization of the gas/ammonia mixture, considered individually or according to all technically possible combinations.

Figure 11:
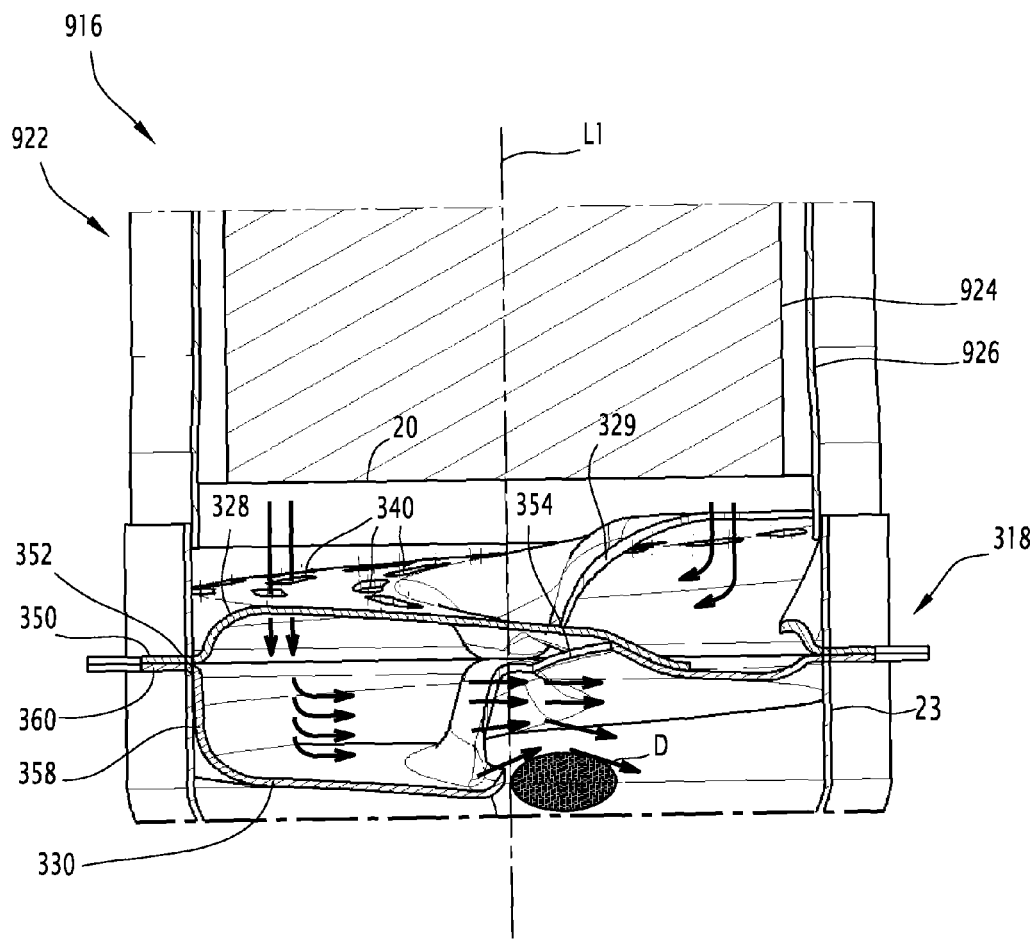
FIG. 11 is a profile view of a second embodiment of an injection portion according to the invention.
Figure 12:
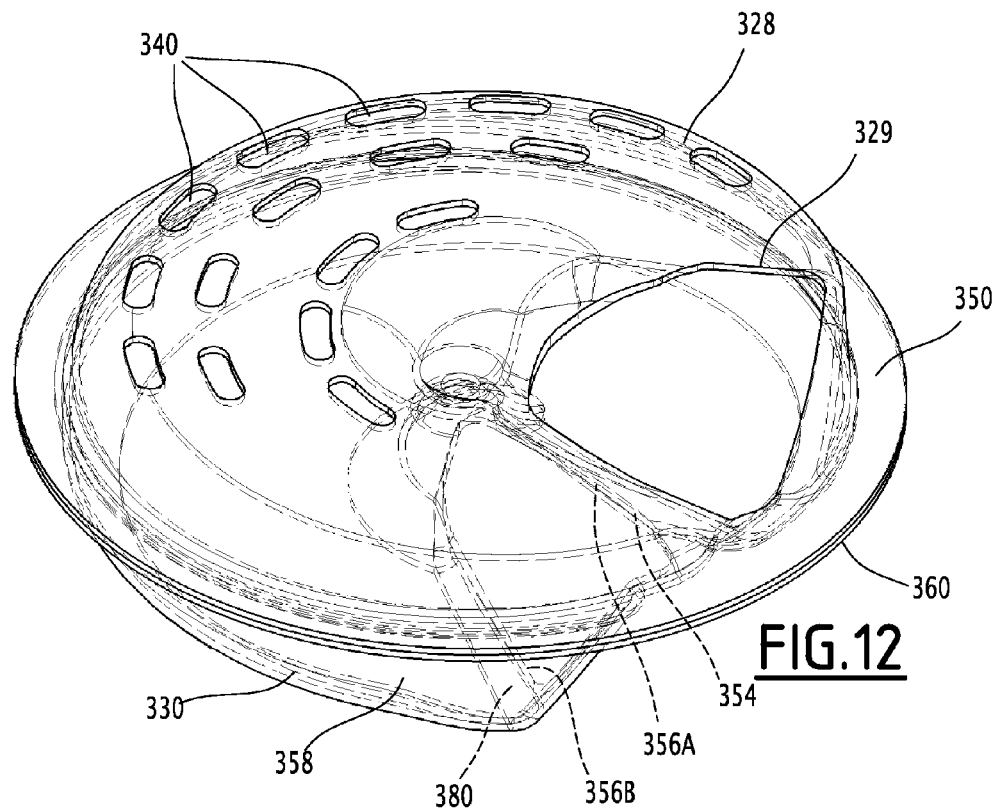
FIG. 12 is a perspective view of the cups of the second embodiment of the injection portion of FIG. 11.
Figure 13:
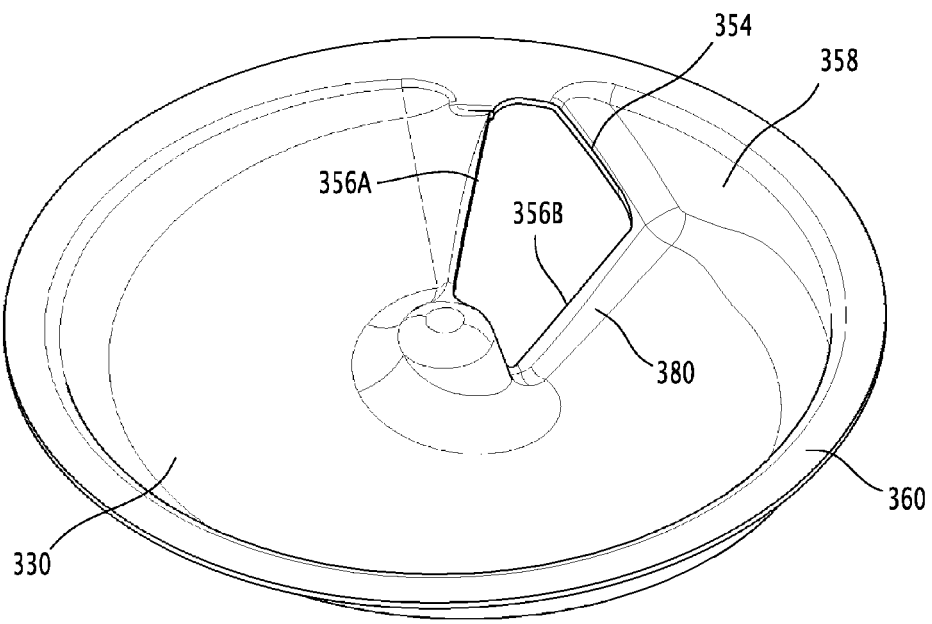
FIG. 13 is a perspective view of one of the cups of the second embodiment of the injection portion of FIG. 11.
Figure 16:
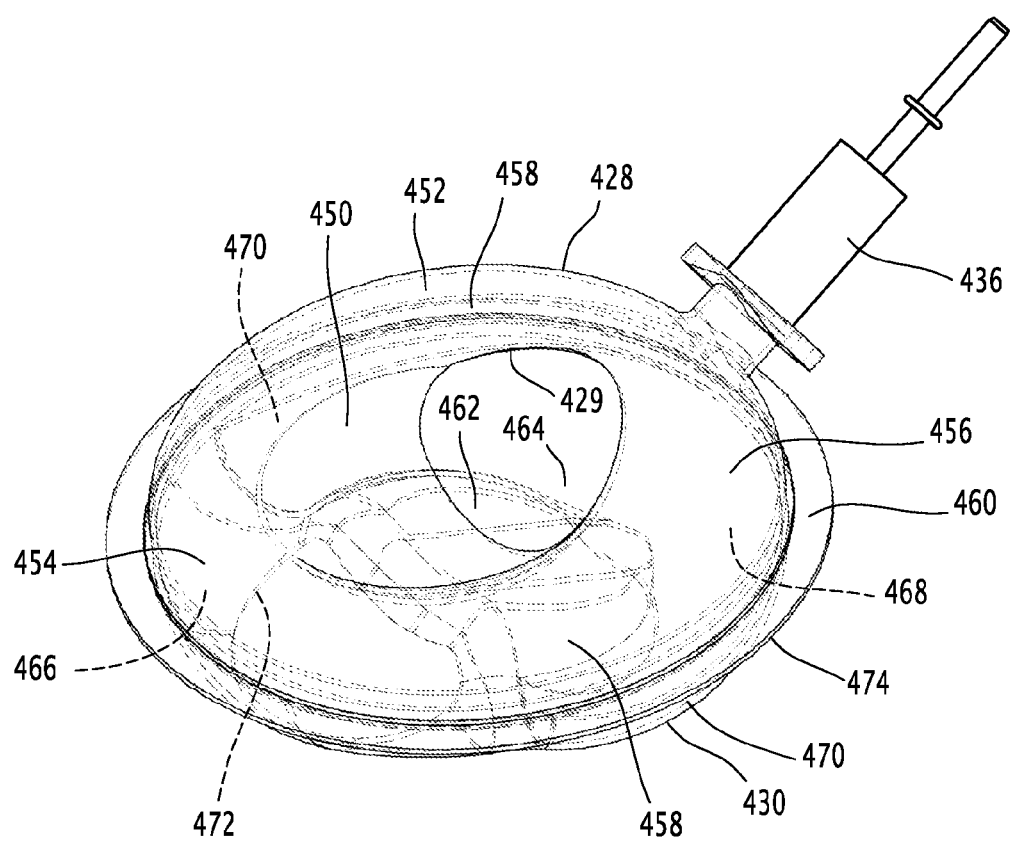
FIG. 16 is a perspective view of the cups of the third embodiment of the injection portion of FIG. 14.

A second embodiment of the injection portion 318 is illustrated in FIGS. 11 (profile view), 12 and 13 (perspective views). The injection portion 318 comprises a first cup 328 and a second cup 330.

The downstream enclosure portion 23 is fastened, sealed against the exhaust gases, to the lower portion of the outer enclosure 926 of the oxidation catalyst 922. The two cups 328, 330 are inside the downstream enclosure portion 23.

The first cup 328 has a bottom winding in a spiral around the central line L1 of the injection portion 318. The first cup 328 has a concavity turned toward the downstream face 22, such that the bottom of the first cup 328 forms a lid of the second cup 330.

The first cup 328 has a large opening 329 at the end of the spiral closest to the upstream face 20. The opening 329 is inclined both relative to the central line L1 and relative to a plane perpendicular to the central line L1.

The first cup 328 has a peripheral rim 350 extending the bottom of the first cup 328 and extending substantially perpendicular to the central line L1, the peripheral rim 350 passing through a peripheral lumen 352 formed in the upstream portion of the downstream enclosure portion 23. The peripheral rim 350 of the first cup 328 is fastened, sealed against the exhaust gases, to the downstream enclosure portion 23, for example by welding.

The bottom of the first cup 328 also includes perforations 340 making it possible to ensure optimal homogenization of the exhaust gases.

The second cup 330 is positioned between the first cup 328 and the downstream face 22, with the second cup 330 having a bottom winding in a spiral around the central line L1 of the injection portion 318.

Preferably, the bottom of the second cup 330 winds in a spiral around the central line L1 of the injection portion 318 while performing at least three quarters of a revolution.

The second cup 330 has an opening 354 at the end of the spiral furthest from the upstream face 20. This opening 354 is limited by the two end edges 356A, 356B of the spiral-shaped bottom of the second cup 330 and by the peripheral wall 358 of the second cup 330, the peripheral wall 358 of the second cup 330 bearing against the inner surface of the duct.

The second cup 330 has a peripheral rim 360 extending the peripheral wall 358 of the second cup 330 and extending substantially perpendicular to the central line L1, the peripheral rim 360 passing through the peripheral lumen 352 formed in the upstream portion of the outer enclosure portion 23. The peripheral rim 360 of the second cup 330 is fastened, sealed against the exhaust gases, to the outer enclosure portion 23, for example by welding.

The peripheral rims 350, 360 of the first and second cups 328, 330 are thus positioned across from and in contact with each other, and are fastened to each other, sealed against the exhaust gases, for example, by welding.

The two cups 328, 330 define a spiral-shaped conduit between them, going from the opening 329 of the first cup 328 to the opening 354 of the second cup 330 and extending over at least 180°, preferably over at least 275°.

The second cup 330 also includes a beak 380 positioned at its downstream end, i.e., the end of the spiral furthest from the upstream face 20. The beak 380 extends the bottom of the second cup 330 toward the upstream face 20 and toward the outside of the spiral conduit, and is defined by the end edge 356B. The beak 380 thus forms a convex groove opening toward the upstream face 20.

As an example, the beak 380 has a curve radius of 5.5 mm and a height of 7 mm, the height of the beak 380 being able to be increased up to 10 mm. The beak 380 extends angularly over 10°, that value being able to be increased up to 90°.

The beak 380 makes it possible to limit the ammonia concentration just after the opening 354, as will be explained in more detail later.

The reagent injector (not shown) is provided to inject into the spiral-shaped conduit defined by the two cups 328, 330. To that end, it is fastened on the bottom of the first cup 328, near the opening 329.

According to one alternative, the injector is fastened on the peripheral wall 358 of the second cup 330.

The operation of the exhaust line according to the second embodiment described above will now be outlined, in light of FIG. 11, in which the exhaust gas stream is shown by arrows.

As before, the exhaust gases arrive on the first cup 328. The gases are collected by the first cup 328 after having passed through the upstream monolith 924.

Then, the exhaust gases penetrate the spiral-shaped conduit through the opening 329 or through the perforations 340 and circulate in the spiral-shaped conduit as far as the opening 354.

At the inlet of the spiral-shaped conduit, the urea is injected and is converted into ammonia during the passage of the exhaust gases in the spiral-shaped conduit.

At the outlet of the spiral-shaped conduit, the beak 380 forces the lower layer of exhaust gas, i.e., the layer of gas close to the second cup 330 and highly charged with ammonia, to change direction abruptly to be oriented upward, i.e., toward the upstream face 20, and to mix with the layer of gas situated just above it, that median layer being less charged with ammonia. The exhaust gases at the outlet of the second cup 330 then have a mean and homogenous ammonia concentration.

Furthermore, the sudden deviation of the lower layer of gas by the beak 380 creates a vacuum just at the outlet of the second cup 330, in the area referenced D in FIG. 11. This vacuum suctions the exhaust gases situated between the outlet of the second cup 330 and the downstream face 22, allowing better rotation of the exhaust gases on the downstream face 22.

As an example, in the case of an injection portion 318 with a diameter of 150 mm and 70 mm long, the uniformity index of the ammonia on the downstream face 22 is increased from 5 to 9 one hundredths.

Furthermore, as in the previous cases, a linear mixer may be integrated inside the spiral-shaped conduit and/or part of the walls of the spiral-shaped conduit may include a wire mesh so as to ensure optimal homogenization of the gases and the urea and/or ammonia.

The advantage of this embodiment is that the distribution of the ammonia on the downstream face 22 is improved, the ammonia thus being uniformly distributed on the downstream face.

A third embodiment of the injection portion 418 is illustrated in FIGS. 14, 15 (profile views) and 16 (perspective view). The injection portion 418 comprises a first cup 428 and a second cup 430.

The downstream enclosure portion 23 is fastened, sealed against the exhaust gases, to the outer enclosure 926 of the oxidation catalyst 922 by the second cup 430. The first and second cups 428, 430 are positioned at the junction between the upstream outer enclosure 926 and the downstream enclosure portion 23, the first cup 428 being inside the upstream outer enclosure 926 and the second cup 430 being inside the downstream enclosure portion 23.

The first cup 428 opens toward the downstream face 22 and includes a rounded wall with no sharp edges. This wall has a hollow central area 450 turned toward the upstream face 20 and a peripheral area 452 protruding toward the upstream face 20 surrounding the hollow central area 450. The protruding peripheral area 452 comprises a lower peripheral portion 454 and an upper peripheral portion 456 opposite each other, the lower peripheral portion 454 having an axial height along the central line L1 that is reduced relative to that of the upper peripheral portion 456. The lower 454 and upper 456 peripheral portions are connected to each other by two opposite side peripheral portions 458.

The first cup 428 is symmetrical relative to the plane passing through the central line L1 of the injection portion 418 and the reagent injector 436 (FIG. 15).

A large opening 429 is formed in the wall of the first cup 428 between the hollow central area 450 and the upper peripheral portion 456 of the protruding peripheral area 452. The opening 429 is inclined both relative to the central line L1 and relative to a plane perpendicular to the central line L1. The opening 429 has a substantially rounded triangular shape, one of the apices being located toward the injector 436.

The first cup 428 has a peripheral rib 460 extending the wall of the first cup 428 and extending substantially perpendicular to the central line L1. The peripheral rim 460 of the first cup 428 is fastened, sealed against the exhaust gases, to the second cup 430, for example by welding.

The second cup 430 is positioned between the first cup 428 and the downstream face 22.

The second cup 430 opens toward the upstream face 20 and includes a rounded wall with no sharp edges. This wall has a central area 462 protruding toward the upstream face 20 and a hollow peripheral area 464 turned toward the upstream face 20 surrounding the central area 462. The hollow peripheral area 464 comprises a lower peripheral portion 466 and an upper peripheral portion 468 that are opposite each other, the lower peripheral portion 466 having an axial height along the central line L1 that is reduced relative to that of the upper peripheral portion 468. The lower 466 and upper 468 peripheral portions are connected to each other by two opposite peripheral side portions 470.

The second cup 430 is symmetrical relative to the plane passing through the central line L1 of the injection portion 418 and through the reagent injector 436 (FIG. 15).

An opening 472 is formed in the wall of the second cup 430 between the central protruding area 462 and the lower peripheral portion 466 of the hollow peripheral area 464. The opening 472 is inclined relative to the central line L1 and relative to a plane perpendicular to the central line L1. The opening 472 is in the shape of a rounded crescent moon, the large side being located across from the injector 436.

The opening 429 of the first cup 428 and the opening 472 of the second cup 430 are angularly offset relative to each other around the central line L1 by substantially 180°.

According to one alternative, a second opening is provided in the wall of the first cup 428 between the hollow central area 450 and the lower peripheral portion 454 of the protruding peripheral area 452, opposite the injector 436 and substantially at the opening 472 of the second cup 430, so as to short-circuit the opening 429 so that part of the gases directly reaches the opening 472 without passing through the duct, thereby decreasing the back pressure.

The second cup 430 has a peripheral rim 474 extending the wall of the second cup 430 and extending substantially perpendicular to the central line L1. The peripheral rim 474 of the second cup 430 is fastened, sealed against the exhaust gases, to the upstream outer enclosure 926 and the downstream enclosure portion 23 as well as the peripheral rim 460 of the first cup 428, for example by welding.

When assembled, the two cups 428, 430 are in the form of a "doughnut" and define two semi-annular conduits between them, going from the opening 429 of the first cup 428 to the opening 472 of the second cup 430.

The reagent injector 436 is provided to inject into the two semi-annular conduits defined by the two cups 428, 430. To that end, it is fastened on the upper peripheral portion 456 of the peripheral area 452 of the first cup 428, near the opening 429. The injector 436 is oriented substantially at 45° relative to the central line L1 such that the jet is oriented toward the central protruding area 462 of the second cup 430.

According to one alternative, the injector 436 is oriented such that the injection direction is perpendicular to the two semi-annular conduits.

According to another alternative, the injector 436 is oriented such that the injection direction is parallel to the tangent to two semi-annular conduits, thereby making it possible to obtain a more compact injection portion 418.

The operation of the exhaust line according to the third embodiment described above will now be outlined, in light of FIGS. 14 and 15, in which the exhaust gas stream is shown by arrows.

As before, the exhaust gases arrive on the first cup 428. The gases are collected by the first cup 428 after having passed through the upstream monolith 924.

Then, the exhaust gases penetrate the duct through the opening 429 (FIG. 14).

At the inlet of the duct, the urea is injected and is converted into ammonia during the passage of the exhaust gases in the duct.

Due to the orientation of the injector 436, the gas stream is distributed between the two semi-annular conduits.

The first part of the gas stream thus uses one of the semi-annular conduits and travels along that conduit following a helical movement around the central line of that conduit to the opening 472. The rounded shape of the two cups 428, 430 initiates the rotary movement of that first part of the gas stream, which performs at least one complete revolution, or up to four complete revolutions, around the central line, in a counterclockwise direction in FIG. 15.

During that time, a second part of the gas stream uses the other of the semi-annular conduits and travels along that conduit following a helical movement around the central line of that conduit up to the opening 472. The rounded shape of the two cups 428, 430 initiates the rotary movement of that second part of the gas stream, which performs at least one complete revolution, or up to four complete revolutions, around the central line, in the clockwise direction in FIG. 15.

Once the gases have passed through the opening 472, they will pass through the decoupling element 920, via the downstream enclosure portion 23 and optionally connecting hoses.

Furthermore, as in the preceding cases, a linear mixer may be integrated inside the duct and/or part of the walls of the duct may include a wire mesh so as to ensure optimal homogenization of the gases and the urea and/or ammonia.

The advantage of this embodiment is that it allows excellent mixing of the gases and the urea and/or ammonia.

The exhaust line according to the invention has the advantage of reducing the distance between the upstream and downstream faces while preserving a sufficient path length of the gases to ensure the conversion of the urea into ammonia. The path is long enough for the reaction that converts the urea, injected into the exhaust gases, into ammonia to be complete, but also for the final exhaust gas/ammonia mixture to be as homogenous as possible.

Thus, the exhaust line according to the first embodiment of the invention makes it possible to protect the mechanical decoupling element from deposits, the risks of corrosion and other mechanical failures. In fact, the assembly of the injection/mixer is very compact and makes it possible to ensure the total decomposition of the urea into ammonia in a reduced bulk, in particular before the exhaust gases pass through the mechanical decoupling element.

Furthermore, the exhaust line according to the invention makes it possible to convert the urea as early as possible, i.e., very quickly after the vehicle is started. In fact, because the assembly of the injection/mixing is positioned quite far upstream in the exhaust line, the cups of the mixer will reach the decomposition temperature of the urea, which is approximately 180° C., very early during the travel cycle. However, this decomposition temperature is decisive for starting the SCR catalyst, which is done at a temperature of approximately 150 to 160° C.

According to a second embodiment of the invention illustrated in FIG. 3, the assembly formed by the injector 934 and the mixer 936 is integrated into the second exhaust gas purifying device 918 and positioned upstream of the SCR catalyst 928. This assembly is thus inserted in the cold pipe 914 of the exhaust line 910 (FIG. 1).

The assembly formed by the injector 934 and the mixer 936 is directly connected to the mechanical decoupling element 920 and positioned directly downstream from the mechanical decoupling element 920. In fact, in the second embodiment, no elements other than the connecting hoses and/or enclosure portions are inserted between the assembly formed by the injector 934 and the mixer 936 and the mechanical decoupling element 920 situated downstream from that assembly. In particular, no exhaust gas purifying device, in particular no DOC, is positioned between the assembly and the mechanical decoupling element 920.

The injector 934 and the mixer 936 are identical to those described for the first embodiment, the injection portion 18 being positioned between an upstream face 20, for example defined by a plane from which the transverse section of the upstream enclosure portion 25 stops increasing and is substantially constant, and a downstream face 22 defined by the downstream monolith 930 of the SCR catalyst 928.

Thus, the upstream face 20 is the face by which the exhaust gases leave the mechanical decoupling element 920, via the upstream enclosure portion 25 and optionally connecting hoses, and enter the mixer 936, and the downstream face 22 is the face by which the exhaust gases leave the mixer 936 and enter the downstream monolith 930.

Thus, the exhaust line according to the second embodiment of the invention makes it possible to improve the start of the SCR catalyst. In fact, the injector mixer assembly being very compact, the distance between the mechanical decoupling element and the SCR catalyst is limited. Thus, the heat exchanges with the outside are limited, which makes it possible to preserve the energy necessary for the evaporation of the urea, then the conversion of the urea as well as the beginning of the SCR catalyst reactions, without needing to isolate in any way.

Furthermore, because the cups of the mixer are at the temperature of the exhaust gases, this makes it possible to limit the appearance of deposits on those cups. In fact, when the cups are at the temperature of the exhaust gases, the temperature is sufficient to completely evaporate the water and the urea.

Furthermore, the injection of the urea being done downstream from the mechanical decoupling element, the latter is saved from any deposit related to the urea or its conversion.

The invention therefore makes it possible, using a compact injector mixer assembly, to place that assembly at different locations in the exhaust line.

The closer this assembly is positioned to the engine, the more effective and inexpensive the depollution of the exhaust gases is to perform, the decomposition temperature of the urea being reached quickly and maintained using cost-effective materials used for the mixer.

When it is not possible to bring the assembly closer to the engine, for example when the space available under the floor is not sufficient, the invention nevertheless makes it possible to perform an effective conversion of the nitrogen oxides early in the travel of the vehicle. In fact, the geometry of the compact assembly ensures, over a very short distance, the conversion of the urea into ammonia, the homogenization of the exhaust gas/ammonia mixture, a good ammonia distribution at the inlet of the SCR catalyst and the beginning thereof, and all as early as possible during the travel of the vehicle.

Furthermore, the exhaust line according to the invention is compatible with the injection of a reducing agent in gaseous form, in particular ammonia. In that case, the urea injector is replaced with an injection system specific to ammonia.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A motor vehicle exhaust line of the type comprising:
   a hot pipe for exhaust gases;
   a cold pipe for the exhaust gases;
   a mechanical decoupling element connecting a downstream end of the hot pipe to an upstream end of the cold pipe;
   a nitrogen oxide treatment device;
   an injector intended to inject a reagent into, or to produce a reagent in the exhaust line upstream of the nitrogen oxide treatment device;
   a mixer intended to mix the exhaust gases and the reagent injected or produced by the injector, said mixer being positioned upstream of the nitrogen oxide treatment device, the nitrogen oxide treatment device being positioned in the cold pipe downstream from the mechanical decoupling element, and the injector and the mixer forming an assembly connected directly to the mechanical decoupling element; and
   wherein the mixer includes an injection portion positioned between an upstream face and a downstream face respectively defined by an exhaust gas inlet into and an exhaust gas outlet outside the mixer, the injection portion comprising an exhaust gas duct extending from the upstream face to the downstream face, the exhaust gas duct having a central line having a set length between the upstream and downstream faces, the injector including a reagent injector mounted on the injection portion and capable of injecting or producing a reagent in the injection portion, the injection portion comprising at least one first cup positioned inside the exhaust gas duct such that a mean path of the exhaust gases in the exhaust gas duct is at least 20% greater relative to the set length.

2. The exhaust line according to claim 1, wherein the assembly is formed by the injector and the mixer is inserted in the hot pipe directly upstream from the mechanical decoupling element.

3. The exhaust line according to claim 1, wherein the assembly is formed by the injector and the mixer is inserted in the cold pipe directly downstream from the mechanical decoupling element.

4. The exhaust line according to claim 1, wherein the nitrogen oxide treatment device is a selective reduction catalyst of nitrogen oxides.

5. The exhaust line according to claim 1, including an oxidation catalyst positioned upstream from the assembly formed by the injector and the mixer.

6. The exhaust line according to claim 1, wherein the set length is substantially comprised between 40 and 140 mm.

7. The exhaust line according to claim 1, wherein the at least one first cup has a bottom wound in a spiral around the central line of the injection portion.

8. The exhaust line according to claim 7, wherein the bottom of the at least one first cup is wound in a spiral around the central line of the injection portion for performing three quarters of a revolution.

9. The exhaust line according to claim 7, wherein the at least one first cup has an opening at an end of the spiral furthest from the upstream face.

10. The exhaust line according to claim 7, wherein the at least one first cup includes a beak at an end of the spiral furthest from the upstream face.

11. The exhaust line according to claim 10, wherein the beak extends the bottom of the first cup toward the upstream face and toward the outside of the spiral.

12. The exhaust gas line according to claim 1, wherein the injection portion includes a second cup positioned inside the exhaust gas duct between the upstream face and the first cup, the second cup having a bottom winding in a spiral around the central line of the injection portion.

13. The exhaust line according to claim 12, wherein the second cup has an opening at an end of the spiral furthest from the upstream face.

14. The exhaust line according to claim 13, wherein the opening of the first cup and the opening of the second cup are angularly offset relative to one another around the central line.

15. The exhaust line according to claim 12, wherein the second cup has an opening at an end of the spiral closest to the upstream face.

16. The exhaust line according to claim 12, wherein the first and second cups define a spiral-shaped conduit between them, starting from an opening of the second cup and going to the opening of the first cup, extending over at least 180°, preferably 275°, and having a straight cross-section substantially larger than 2,300 mm$^2$.

17. The exhaust line according to claim 12, wherein the injection of the reagent is done between the first cup and the second cup.

18. The exhaust line according to claim 1, wherein the first cup includes a rounded wall having a central area protruding toward the upstream face and a hollow peripheral area turned toward the upstream face surrounding the protruding central area, an opening being formed in the wall of the first cup between the protruding central area and the hollow peripheral area.

19. The exhaust gas line according to claim 18, wherein the injection portion includes a second cup positioned inside the exhaust gas duct between the upstream face and the first cup, the second cup including a rounded wall having a hollow central area turned toward the upstream face and a peripheral area protruding toward the upstream face surrounding the hollow central area, and an opening being formed in the wall of the second cup between the hollow central area and the protruding peripheral area.

20. The exhaust line according to claim 19, wherein the first and second cups are configured to impart a helical movement to the exhaust gases from the opening of the second cup to the opening of the first cup.

21. The exhaust line according to claim 1, wherein the first cup has perforations with a diameter substantially equal to 5 mm or an opening.

22. The exhaust line according to claim 1, wherein the first cup comprises a wire mesh layer over at least part of a surface of the first cup.

23. The exhaust line according to claim 1, wherein the reagent injector is oriented such that an injection direction is perpendicular to the injection portion.

24. The exhaust line according to claim 1, wherein the reagent injector is oriented such that the injection direction is parallel to a tangent to the injection portion.

* * * * *